United States Patent [19]

Tremblay et al.

[11] Patent Number: 4,584,458

[45] Date of Patent: Apr. 22, 1986

[54] WELDING WIRE FEEDER SYSTEM FOR ELECTRIC ARC WELDING APPARATUS

[75] Inventors: Joseph A. Tremblay, St. Alma; Lionel E. Talbot, Ville de la Baie, both of Canada

[73] Assignee: Alcan International Limited, Montreal, Canada

[21] Appl. No.: 643,960

[22] Filed: Aug. 24, 1984

[30] Foreign Application Priority Data

Aug. 26, 1983 [GB] United Kingdom ............... 8323036

[51] Int. Cl.⁴ .................................................. B23K 9/12
[52] U.S. Cl. ................................ 219/137.71; 219/136
[58] Field of Search .................. 219/137.71, 130.31, 219/136

[56] References Cited

U.S. PATENT DOCUMENTS 4,247,751 1/1981 Ashton et al. ................. 219/130.31

4,301,355 11/1981 Kimbrough et al. ........... 219/137.71

Primary Examiner—Clifford C. Shaw
Attorney, Agent, or Firm—Cooper, Dunham, Clark, Griffin & Moran

[57] ABSTRACT

A welding wire feeder system for an electric arc welder in which the wire feed motor M is powered from a pulse width modulated power supply comprising a power transistor Q10 controlled by a pulse signal on line 31 from a pulse width modulator comprising an integrated circuit A3. A control voltage proportional to the arc voltage and a feedback voltage indicative of the feed motor speed are generated and applied to respective inputs of a high gain amplifier A4-1 whose output error signal is either high or low dependent upon the relative values of the control and feedback signals. Control is effected in such a manner that an increase in welding arc voltage causes a corresponding increase in the welding wire feed rate, and vice versa.

10 Claims, 6 Drawing Figures

WELDING WIRE FEEDER SYSTEM FOR ELECTRIC ARC WELDING APPARATUS

This invention relates to electric arc welding apparatus and in particular to an improved control system for use in such apparatus for controlling the speed of advance of the welding wire electrode.

FIGS. 1, 2 and 3 of the accompanying drawings are simplified block diagrams showing known wire electrode feeding systems. FIG. 1 shows a constant speed closed-loop system where a nominal speed is set manually by means of a potentiometer VR1 connected between the supply and common. The potentiometer VR1 provides a control signal to a control system 1 where it is combined with a feedback signal to produce an error signal on line 2, this latter signal controlling the speed of rotation of the wire feed motor 3. The speed of the motor 3 is measured by a speed sensor 4 to produce a feedback signal which is amplified in amplifier 5 and passed to the control system 1 for combination with the control signal, as aforsaid. The effect of the feedback control system is to keep the wire feed speed constant under any conditions of operation. This type of control is frequently used in semi-automatic welding operations.

FIG. 2 shows an open-loop variable speed system which is used mainly in heavy welding operations such as the rebuilding of worn parts in preparation for the machining of such parts. This second type of control consists of a voltage divider resistive network R100, VR2 which is connected in such a way as to sense the actual welding voltage—i.e. the arc voltage, and to use such voltage as the power source for the wire feed motor 3. Resistor VR2 is variable for the purpose of fine adjustment of the nominal wire electrode feed rate. Once this adjustment is made, it is hoped that the feed rate adjusts in a manner directly proportional to the welding voltage and, in this way, tends to maintain the welding conditions constant.

An improved version of this second type of control makes use of electronic circuitry to eliminate the losses caused by the insertion of the resistive divider between the welding arc voltage and the wire feed motor 3 and also provides an improved response to changes in the welding arc voltage. Such feeders are described in U.S. Pat. Nos. 4,322,602, 4,273,988 and 3,627,975. A similar system, but with improvements such as welding current compensation and electrode size selection is described in European patent application No. 0043588.

FIG. 3 shows a third type of system where the welding voltage (arc voltage) is used in a closed loop system to control the speed of rotation of the motor 3. Such a system is described in U.S. Pat. No. 4,301,355.

Many known feeders, such as depicted in FIGS. 1, 2 and 3 are very difficult to use, even expert welders have great difficulties in getting proper operation of the welding equipment. One of the main difficulties lies in the proper ignition of the arc. Also, it is impossible to use known types of feeder in ambient magnetic fields exceeding 175 Gauss, a common requirement in certain industries. This is due mainly to the basic concept of these feeders and to the control components used. Welding in magnetic fields with an intensity of 135 Gauss is achieved with conventional feeders and this with the use of magnetic shields. Without shields this maximum is reduced to 116 Gauss, and even then by expert welders only.

The apparatus of the present invention was designed initially for the purpose of allowing semi-automatic welding in high intensity magnetic fields. However the apparatus developed has been found so simple to use that wider application is now envisaged, with the emphasis being on the production of good quality welds under normal conditions by operators with little or no experience.

In accordance with the invention there is provided a welding wire feeder system for an electric arc welding apparatus, said system comprising means including a feed motor for feeding a welding wire electrode towards a workpiece, means for generating a feedback signal indicative of the speed of rotation of the feed motor, means for generating a control signal indicative of the instantaneous voltage at the tip of the welding wire (the arc voltage), means for combining said control signal and said feedback signal to generate an error signal, a pulse width modulated power supply for supplying power from a power source to said feed motor, said power supply being operable to supply to the feed motor a pulse voltage whose mark/space ratio is controlled by said error signal, and means for controlling said power supply in response to said error signal in such a way that an increase in welding arc voltage causes a corresponding increase in the welding wire feed rate, and vice versa.

In a preferred embodiment of the invention, the power supply comprises a power transistor for pulsing the supply of current from the source to the motor and a pulse width modulator which is operable to generate a pulse signal whose mark/space ratio is controlled by said error signal, said pulse signal being applied to the control electrode of the power transistor to thereby control the width of the pulses supplied to the feed motor.

Preferably the error signal has only two values, i.e. those which represent, respectively feed motor speed high or feed motor speed low, so that the system effectively acts as an on-off or "relay" servo. The reason for this choice of error signal is that it has been found disadvantageous to use a linear error signal as compared to a switched on-off signal. This results in a decrease in the effect of the inherent mechanical inertia of the feed motor and its associated gear train and in particular to their slowness to respond to rapid changes in arc voltage. It has been found that, with this type of signal, the feed motor is forced to react instantly thereby compensating perfectly for any changes in the desired arc voltage.

In any event, it is clearly desirable that the rotational inertia of the feed motor and its ancilliaries be kept as low as possible and this has led to the adoption of a particularly advantageous motor speed sensor, to be described in detail hereinafter.

In order that the invention may be better understood, an embodiment thereof will now be described by way of example only and with reference to FIGS. 4 and 5A and 5B of the accompanying drawings in which:

DETAILED DESCRIPTION

Figure 4:
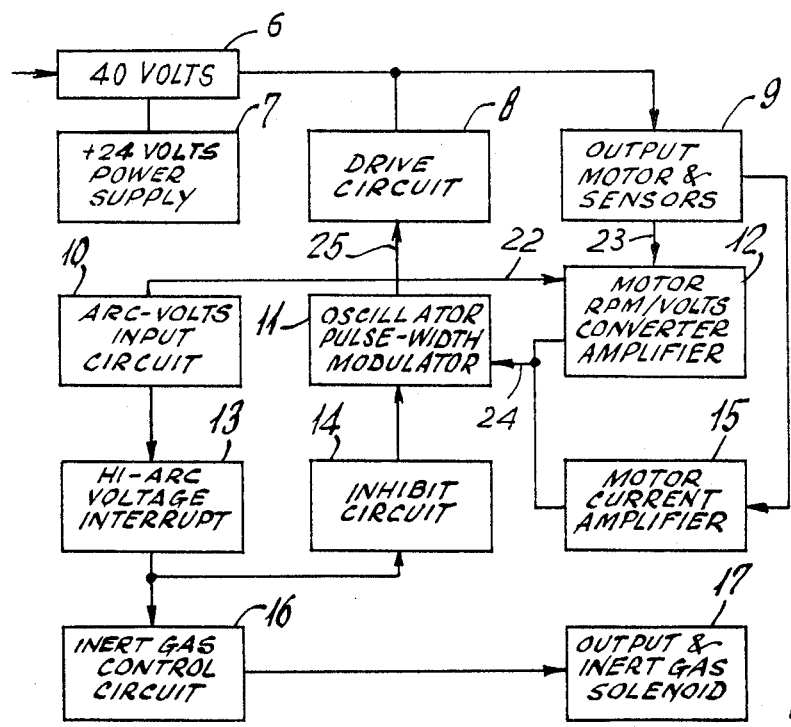
Figure 5A:
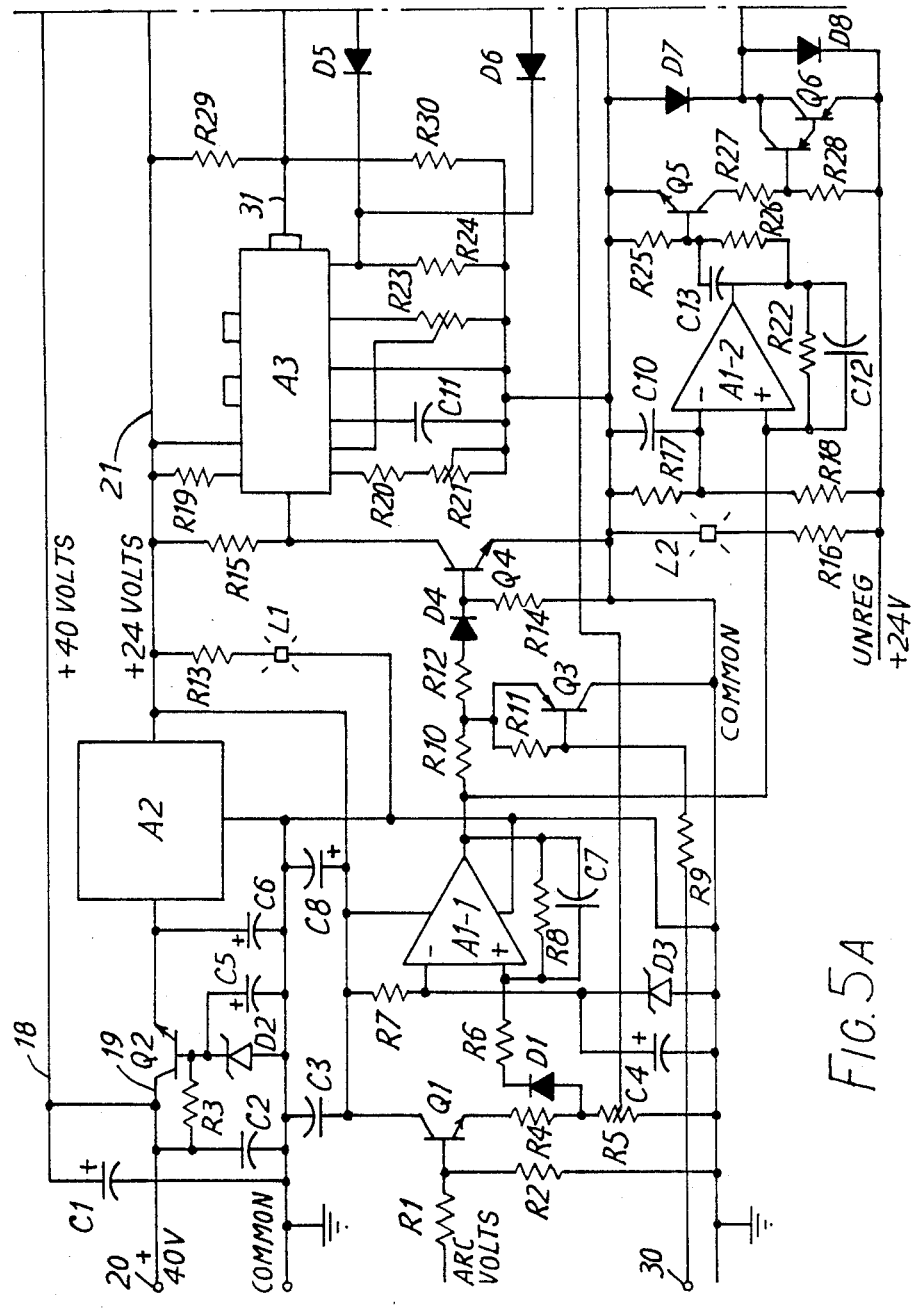
FIG. 5A and 5B (hereinafter collectively referred to as FIG. 5) together constitute a circuit diagram showing in more detail the welding wire feeder system of FIG. 4.
Figure 5B:
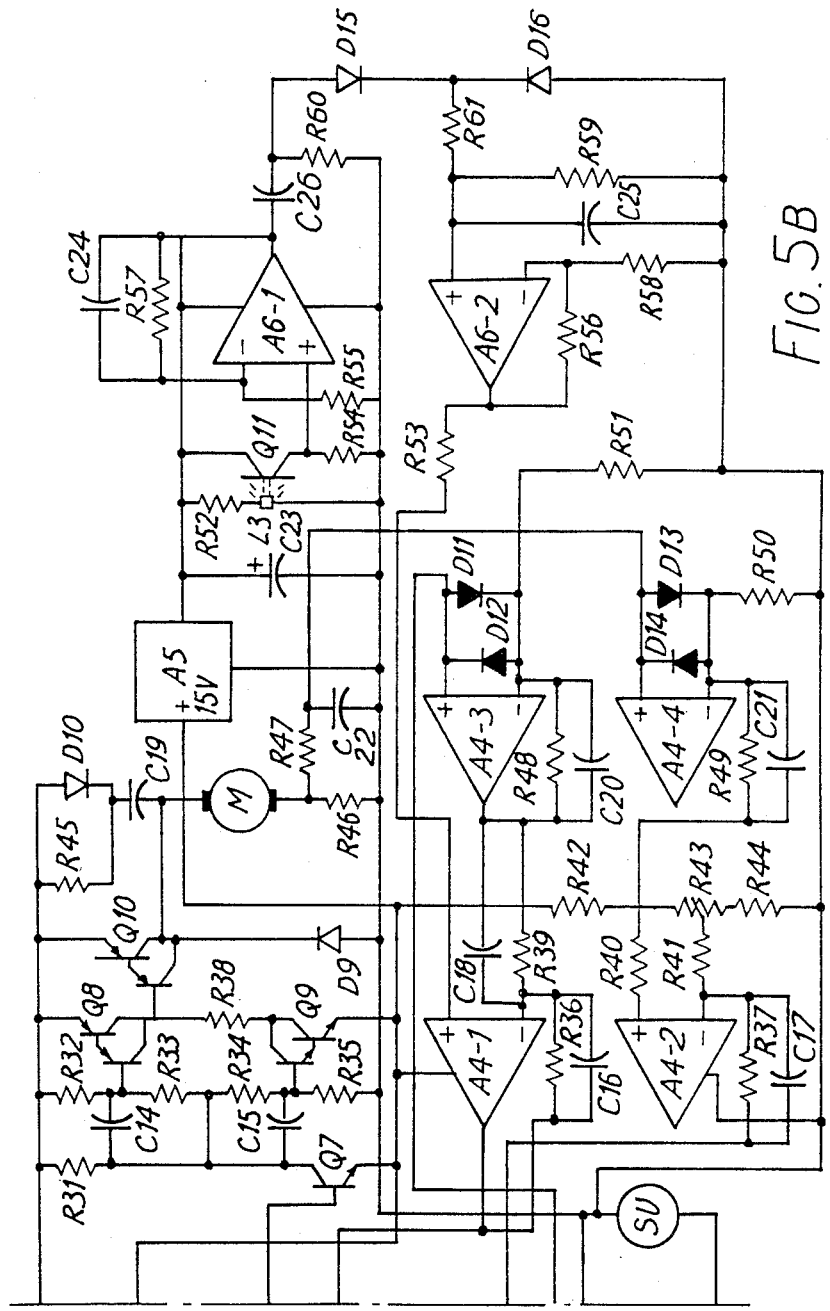

Referring now to FIGS. 4 and 5, a 40 volts DC supply 6 supplies power directly to a motor drive circuit 8 and motor output and sensor circuit 9. These latter are described in greater detail below. The supply 6 also supplies current to a 24 volt power supply 7 which is operable to supply the remaining circuits with power.

The power supply 7 comprises a pair of input filtering capacitors C1, C2 connected to separate 40 volt lines 18, 19 leading from the 40 volt input terminal 20. The line 18 powers the circuits 8 and 9 as aforsaid while the line 19 is connected to the emitter of a series pre-regulator transistor Q2. The base of the transistor is connected via zener diode D2 to common and resistor R3 connects between the base and emitter of transistor Q2. The collector of transistor Q2 connects to the input of a 24 volt 3-terminal integrated circuit regulator A2. The input to the regulator is limited by this pre-regulator to 33 volts, this being necessary due to the fact that the maximum input to the 24 volts integrated circuit regulator is 36 volts. This voltage would otherwise be exceeded when the batteries are freshly charged, or being charged with the welding apparatus in operation or when welding arc generated transients are fed back from the batteries.

Capacitor C5 provides additional filtering and capacitor C6 serves to stabilise the 24 volts regulator by providing a path to ground for high frequency transients. Capacitors C3 and C8 are low and high frequency output filter capacitors, which are operable to supply the instantaneous peaks of high current required by the switching load. Resistor R13 is a series dropping resistor to limit the current through an indicating lamp L1 connected to the output of the regulator A2. The output of the regulator further connects to a main supply bus 21 which supplies a stabilised 24 volts to the remaining circuitry.

Figure 1:
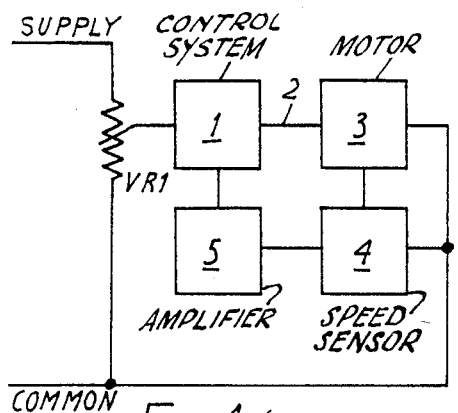
FIGS. 1, 2 and 3 are simplified block diagrams showing known wire electrode feeding systems, as described above, is a block diagram showing in outline form a welding wire feeder system according to the invention.
Figure 2:
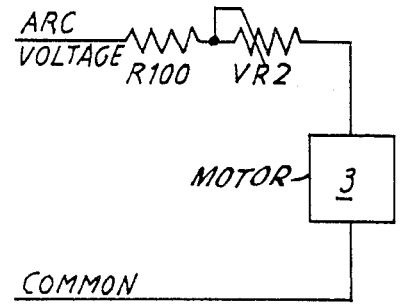
Figure 3:
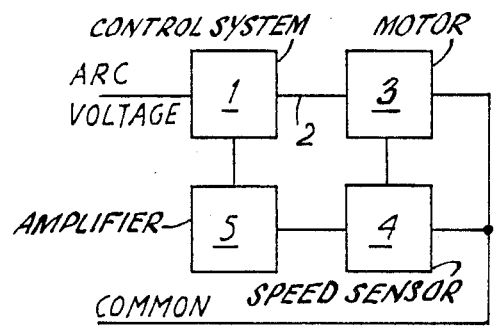

The control circuitry of FIGS. 4 and 5 is in outline that of FIG. 3 to which reference has already been made. Referring particularly to FIG. 4, the arc voltage is sensed in an arc volts input circuit 10 and a signal representing the arc volts presented on a line 22. Likewise the rotational speed of the feed motor is sensed and a signal representing motor speed is applied to line 23. The signals on lines 22 and 23 are compared in circuit block 12 to produce an error signal on line 24 which is applied to a pulse width modulator circuit 11. This latter circuit produces an output on line 25 which is a pulse signal whose mark/space ratio at any time is representative of the value of the error signal on line 24. The pulse signal is applied to drive circuit 8 and finally to the motor drive circuits 9 to control the speed of the feed motor.

A high arc voltage interrupt circuit 13 is provided in conjunction with an inhibit cicuit 14 to turn off the pulse width modulator whenever the arc voltage exceeds a predetermined limit, in this case 36 volts. This has the effect of turning off the feed motor. The inhibit circuit has further functions which are described below.

The high arc voltage interrupt circuit 13 also controls the operation of an inert gas control circuit 16 and associated output and inert gas solenoid circuit 17. When the circuit 13 indicates an arc voltage less than the predetermined level of 36 volts, the control circuit 16 causes an inert gas solenoid to be energised to supply inert gas to the welding torch (not shown).

A motor current amplifier 15 is also provided to override the error signal control on line 24 should the motor current (which is sensed by circuitry in block 9) exceed a predetermined level. This is achieved by limiting the pulse width of the pulses applied to the feed motor, thereby limiting the motor torque.

The action of the circuitry outlined with reference to FIG. 4 will now be explained in greater detail with reference to FIG. 5. For convenience, with the exception of blocks 6 and 7 which are described above, each block of FIG. 4 will be described separately with reference to FIG. 5.

ARC VOLTAGE INPUT CIRCUIT 10

The primary purpose of this circuit is to reduce the normal arc voltage which, in the absence of an arc, will be at approximately 80 volts, to a level which can be handled by the remaining circuitry. The arc voltage is first applied to a resistance network comprising resistors R1 and R2, the junction of which is connected to the base of a transistor Q1. Transistor Q1 is connected in emitter-follower configuration and has an output which is applied to series connected emitter resistors R4 and R5. Resistors R4 and R5 are of equal value, resistor R5 being a variable resistor which is mounted on the front panel of the cabinet (not shown) containing the circuitry. This enables the nominal speed of the wire feeder to be adjusted. The arc voltage input circuit has two outputs, one from the junction of resistors R4 and R5 to the high arc voltage interrupt circuit 13 and one, on the above referred to line 22, to the circuit block 12.

HIGH ARC VOLTAGE INTERRUPT CIRCUIT 10

This circuit basically comprises the comparator A1-1 and associate circuitry. The signal representing the arc voltage appearing at the junction of resistors R4 and R5 is applied to the anode of diode D1 and thence via resistor R6 to the non-inverting input of comparator A1-1. A resistor R7 and zener diode D3 define a reference voltage which is applied to the inverting input of comparator A1-1. The action of the circuit is such that the output of comparator A1-1 is near zero for as long as the signal applied to the non-inverting input (the arc voltage signal) is lower than the reference voltage defined by zener diode D3 and resistor R7. The circuit is set up in such a way that, whenever the arc voltage is higher than 36 volts, the signal at the non-inverting input of comparator A1-1 exceeds the reference voltage so that the output of the comparator switches instantly to a high value - in this case 22 volts. Resistor R8 provides some backlash to the comparator such that when the arc voltage fluctuates around 36 volts, the comparator does not switch erratically from one state to the other. Capicitor C7 is a speed-up capacitor.

INERT GAS CONTROL CIRCUIT 4 AND OUTPUT CIRCUIT AND INERT GAS SOLENOID 11

This circuit basically comprises comparator A12, driver transistors Q5 and Q6 and solenoid valve SV. The input to the circuit is taken from the output of comparator A1-1 to the non-inverting input of comparator A1-2. A lamp L2 indicates when power is applied to the circuit. Series resistor R16 limits the current through the lamp and keeps the voltage across the lamp at approximately 12 volts.

Resistors R17 and R18 form a voltage divider providing a reference voltage for the non-inverting input of comparator A1-2. Capacitor C10 in parallel with resistor R17 filters any transients that appear at the input to the comparator. Feedback resistor R22 and parallel capacitor C12 are respectively a backlash resistor and speed-up capacitor. The circuit is set up such that when a high level signal is applied to the inverting input (indicating a high arc voltage), the output of comparator A1-2 is low and, in these circumstances the transistors Q5 and Q6 connected at the output of comparator A1-2 are both switched OFF. Conversely, when the signal from comparator A1-1 is low, the output of comparator A1-2 is high and transistors Q5 and Q6 are ON, the solenoid valve then being energised to feed inert gas to the welding torch.

Capacitor C13 is a bypass capacitor for resistor R26 during the transition periods, and speeds up the turn-on of transistor Q5. Resistor R25 speeds up the turn-off on transistor Q5. When transistor Q5 is conducting, voltage is dropped in the series resistor R28 and this voltage drop forward-biases transistor Q6 and initiates its conduction. Once transistor Q6 is conducting a much higher current results through transistor Q5 and through the base-emitter junction of transistor Q6 such that transistor Q6 operates in a saturation mode and maximum voltage is applied to the solenoid valve SV. Resistor R27 in series with resistor R28 and transistor Q5 limits the base-emitter current of transistor Q6.

Diode D8 is connected in parallel with transistor Q6 in order to protect transistor Q6 against back E.M.F. generated by the solenoid valve when transistor Q6 turns on. Diode D8 acts to bypass transistor Q6 whenever the back E.M.F. generated is greater than the supply voltage. Diode D7 serves the same purpose when transistor Q6 turns off, and the solenoid is de-energised. The back E.M.F. in this case is of opposite polarity and is conducted to the common line via diode D7.

A separate power switch and a separate unregulated source of power (24 volts) is used for the solenoid valve due to the magnitude of the current drawn by the solenoid. The separate switch allows the disabling of the circuit when inert gas is not required by the welding process.

INHIBIT CIRCUIT 14

This circuit is operable to inhibit operation of the pulse width modulator 11 whenever the signal from comparator A1-1 is high, representing an arc voltage greater than the predetermined level. The signal from comparator A1-1 is applied to series-connected resistors R10 and R12, thence to diode D4 and finally to the base-emitter junction of transistor Q4. Resistor R14 is a fast turn-off resistor; diode D4 ensures the turn-off of transistor Q4 by elevating the voltage required to maintain it on.

When transistor Q4 is conducting, the voltage appearing at the junction of resistor R15 and the collector of transistor Q4 is near zero. This low voltage, when applied to control circuit A3 (forming part of the pulse width modulator 11, and to be described later), turns all the functions of the circuit A3 off and the operation of the feeder motor is thus inhibited.

Connected to the junction of resistors R10 and R12 is the emitter of transistor Q3. The base of transistor Q3 is connected to the junction of resistors R9 and R11, the former of these being connected to a terminal 30 to which is connected an inch switch (not shown). The connector of transistor Q3 is connected to the common line.

When the arc voltage is high, operation of the feed motor would normally be inhibited, as described above. However, if despite this it is desired to advance the wire-electrode, the inch switch, which is located in a convenient position on the pistol grip of the welding torch, may be activated. The inch switch is operable to connect the free end of resistor R9 to the common line so that current flows through resistors R9 and R11 to thereby turn transistor Q3 on. In these circumstances, the voltage appearing at the junction of resistors R10 and R12 is brought near zero and transistor Q4 is turned off. Control circuit A3 thus turns on and the feed motor is activated.

The inch switch can be activated at any time during the welding process without disturbing the variable speed control. This feature is especially useful when welding in high intensities of magnetic field where the ejection of molten metal is a severe problem and, at which time, the arc voltage increases sharply above the aforsaid predetermined level of 36 volts at the instant of ejection. The inhibit circuit is thus activated and the control circuit is switched off. With the inch switch depressed, the motor speed increases to a maximum at such particular instants, and remains at that speed in order to replace the metal lost during ejection. As soon as the metal is replaced, the feed motor returns to the nominal speed.

OSCILLATOR AND PULSE-WIDTH MODULATOR 11

This circuit principally comprises the above-referred to control circuit A3. In the particular embodiment illustrated, the control circuit A3 is an integrated circuit, type MC3420 which is a multifunction integrated circuit. Only the functions necessary for an understanding of the present invention will be detailed herein.

Resistor R19 connected to the regulated 24 volts line 21 supplied power to the control circuit A3 in order to run an internal oscillator. The frequency of this oscillator is set by the values of series resistors R20 and R21 and of capacitor C11, connected to the common line. Fine tuning of the operating frequency is achieved by adjusting resistor R21, which is variable. The preferred frequency of oscillation is around 20 kiloHertz.

Trimmer resistor R23 is set such that it limits the ON time of the pulse-width modulated output signal which appears on line 31. Resistor R23 is fed by a reference voltage which is internally generated by the MC3420.

The required function of the integrated circuit is enabled by the installation of jumpers between pins 8 and 5 and 6 and 14. A further jumper is also installed between pins 11 and 13 to thereby connect in parallel the internal output circuits such that the maximum duration is available (50% duration from a single output node). Resistor R29 is the load resistor for the output circuits.

The feedback (error) signal is applied to pin 6 of the MC3420 from which point a load resistor R24 is connected to ground. The error signal varies from 8 volts to 2 volts in order to control the pulse width of the output on line 31. At an error signal of 2 volts the pulse width is at a maximum; in fact, if the trimmer resistor R23 is set such that the voltage applied to pin 9 is below 2 volts then the output is on continuously. When the error voltage is above 8 volts, the output is off completely.

Therefore the pulse width can be varied from full on to full off depending upon the error signal which reflects the motor speed and current as compared to the arc voltage signal. The output on line 31 is in pulsed form and its on time duration is set by the error signal.

DRIVE CIRCUIT 8

The drive circuit 8 receives the pulse-width modulated signal on line 31 and applies it to the base electrode of transistor Q7. Resistor R29 in the load circuit of control circuit A3 also serves to limit the base current of transistor Q7. Resistor R30 speeds up the turn-off of transistor Q7. The transistor Q7 operates in the saturation mode, its on time being dependent upon the width of the pulse applied to it on the line 31.

Resistor R31 is the load resistor for transistor Q7, the output voltage appearing at the junction of R31 and the collector of Q7. This voltage varies from near zero to plus 40 volts. Capacitors C14 and C15 are connected to respective junctions of a potential divider comprising resistors R32, R33, R34 and R35, and act as speed-up capacitors. During the transition period (switching from 0 volts to 40 volts and vice versa) they bypass the resistors R33 and R34 which are base current limiting resistors for transistors Q8 and Q9. Resistors R32 and R35 are turn-off speed-up resistors for transistors Q8 and Q9. When the junction of resistor R31 and the collector of transistor Q7 is high, transistor Q8 is turned off and transistor Q9 is turned on. In this situation, current is being drawn from the 40 volts supply via the emitter-base junction of output transistor Q10 (this latter forming part of the output motor circuits and sensors 9), resistor R38, which limits this current, and the collector-emitter junction of transistor Q9. The output transistor Q10 is therefore on. When the junction of resistor R31 and the collector of transistor Q7 is at a low voltage (near zero), transistor Q9 is turned off and transistor Q8 is turned on, the full 40 volts appearing at the base of output transistor Q10. In these circumstances, the voltage appearing across the base-emitter junction of transistor Q10 becomes insufficient to maintain its conduction and transistor Q10 turns off.

OUTPUT, MOTOR AND SENSOR CIRCUITRY 9

Transistor Q10 is the output transistor connected in series with the feed motor M. Transistor Q10 is turned on and off by the output drive circuit, as described above. The average voltage applied to the feed motor is the integration of the on time as compared to the total time of one cycle of the operating frequency. For an operating frequency of 20 kHz, the duration of one cycle is 50 microseconds. In order to obtain an average of 6 volts applied to the feed motor M, the on time has to be 7.5 microseconds with a supply voltage of 40 volts. For an average of 20 volts, the on time has to be 25 microseconds. The motor speed for these two voltages are respectively 1350 and 3410 RPM. When translated into inches of wire-electrode feed-rate per minute they yield, respectively, 85 inches/min. and 214 inches/min. The D.C. motor M has a maximum speed of revolution of 5300 RPM at 40 volts. This would occur when transistor Q10 is continuously on. The wire-electrode feed-rate would then be 333 inches/min.

Diode D9 is connected in series with transistor Q10 between the 40 volt line 18 and the common rail. Diode D9 is a free wheel diode which has the same purpose as diode D7, described above. Diode D9 has the additional function of dynamically braking the motor when driving power to the latter is reduced or switched off by the control action. The motor then effectively becomes a generator, the generated current being proportional to the rotor speed. Diode D9 becomes forward biased and causes a short circuit across the motor M3. The resultant high current causes the motor either to stop or to run at a new steady lower speed, as required. In either case, the required effect is achieved very quickly, normally within a few cycles of drive pulse. Resistor R46 is a current shunt, and has a value of 0.02 ohms. For a given motor current of 5 Amperes, 100 millivolts is developed across resistor R46. This voltage is filtered by a resistor R47 and capacitor C22 which removes high frequency transients and motor brush noise. The filtered voltage thus generated is passed as a control signal to the motor current amplifier 15, as will be explained later.

Resistor R45, diode D10 and capacitor C19 form a snubber circuit, the purpose of which is to pass heavy current during the on/off transition periods of transistor Q10. Capacitor C19 charges when transistor Q10 is off and discharges when it is on. As soon as a potential difference exists between the supply and the motor, capacitor C19 starts charging towards that potential difference. The current required for the charging of capacitor C19 is limited only by the voltage drop across diode D10, connected in parallel with resistor R45, and by the motor impedance which in turn is dependent upon the current passing through it the instant before; in other words, the charging current will equal the motor current.

The snubber circuit, being a lower impedance path than the collector-emitter junction of transistor Q10, shorts out the transistor and then very little current flows through transistor Q10 until capacitor C19 has fully charged. The result of this is that the total power dissipation of transistor Q10 is reduced by 20% and therefore the transistor runs cooler and will last longer. When transistor Q10 turns on, the supply potential is applied to both sides of capacitor C19 and the capacitor will discharge via resistor R45, which latter resistor also limits the discharge current.

A 15 volt integrated circuit regulator A5 is connected to the line 21 for the purpose of supplying a very stable and low noise voltage to an infra-red light-emitting diode L3 connected at its output. Capacitor C23 provides the usual additional filtering. Transistor Q11 is a photo-transistor which is sensitive to infra-red light rays.

The circuit comprising the diode L3 and transistor Q11 is used for the purpose of accurately measuring the feed motor speed. For this purpose, the light-emitting diode L3 and photo-transistor Q11 are mounted on the end cover of the motor M where the ventilation fan is installed in such a way that the fins of the ventilation fan interrupt the transmission of infra-red rays from the diode L3 to the transistor Q11. Each time a pulse of light reaches the transistor Q11, an output pulse appears on the emitter electrode of that transistor. The generated pulse frequency is the motor RPM multiplied by the number of blades in the ventilation fan. In the particular motor used, the ventilation fan has 8 blades. Resistor R52 limits the current through the diode L3 and resistor R54 is the emitter load of transistor Q11. The resulting signal is passed to the circuit block 12, as will be described below.

CIRCUIT BLOCK 12—MOTOR RPM/VOLTS CONVERTER AMPLIFIER

The signal appearing at the junction of transistor Q11 and resistor R54 has a frequency equal to 8 times the RPM of the feed motor. At the maximum RPM of the motor, this frequency equals 706.67 Hz. This signal is applied to the non-inverting input of amplifier A6-1 whose gain, determined by resistors R54 and R57, is extremely high. Capacitor C24 filters any high frequency noise appearing at the output of amplifier A6-1. The high gain of amplifier A6-1 is such that the output switches from the supply voltage +15 volts to zero volts at the frequency of the applied signal. The frequency of the applied signal varies linearly with the RPM of the motor and is therefore an excellent representation of the wire-feed-rate. The output of amplifier A6-1 is applied to a differentiator circuit composed of capacitor C26 and resistor R60. The purpose of this differentiator is to obtain a constant timing of the pulsed waveform independently of the frequency of the incoming signal. The differentiator time constant has to be shorter than the shortest on time of the signal, the components setting this pulse duration, in the particular example illustrated, at 33.33 microseconds. The output of the differentiator is applied to diodes D15 and D16 whose function is to eliminate the negative portion of the pulses before they are applied to an integrated circuit composed of resistors R59 and R61 and capacitor C25. The integrator circuit has a relatively slow response time as compared to the aforsaid differentiator circuit, its timing being 500 microseconds charging time and 3 milliseconds discharging time.

Each differentiated pulse of 33.33 microseconds charges capacitor C25 a small amount and, inbetween the charging pulses, the capacitor discharges through resistor R59 until the next pulse occurs. At a given RPM of the motor, a state of equilibrium exists where the discharging rate equals the charging rate and a D.C. voltage can be measured as a representation of this state of equilibrium. At low motor RPM the charging time is always equal to 33.33 microseconds and the discharging rate is relatively long. The D.C. voltage measured is thus very low. As this speed increases, the charging rate of capacitor C25 increases and, as the charging pulses come more often, capacitor C25 charges only slightly more that it discharges and thus gradually builds up more charge. In this way, the D.C. voltage measured increases as the RPM of the motor increases.

This integrated signal requires amplification before it can be processed further. This is accomplished by amplifier A6-2 whose gain is set by the relative values of resistors R56 and R58. The output of amplifier A6-2 is connected, via a current limiting resistor R53, to the non-inverting input of amplifier A4-1.

The inverting input of amplifier A4-1 is supplied with an amplified version of the arc voltage signal at the slider of variable resistor R5. Amplification is carried out by amplifier A4-3 whose gain is set by the relative values of resistors R48 and R51. Capacitor C20 is a low value capacitor which rolls off the gain of amplifier A4-3 at higher frequencies, thereby diminishing the high frequency transients as compared to the signal voltage, which is amplified. Back-to-back diodes D11 and D12 prevent the difference of voltage between the two inputs of amplifier A4-3 from exceeding 0.6 volts, this being to protect the input circuitry of the amplifier in case of severe imbalance between the two inputs.

The output of amplifier A4-3 is connected via a resistor R39 to the inverting input of amplifier A4-1 where it is compared with the signal coming from amplifier A6-2. Resistors R39 and R36 determine the gain of amplifier A4-1. Capacitor C18 bypasses resistor R39 on pulsed inputs from the command signal; that is, as the arc voltage fluctuates rapidly with the welding conditions the rapid changes receive more amplification from amplifier A4-1 than the D.C. voltage appearing on the same input which is representative of the nominal wire feed-rate required by the normal welding conditions. These pulses represent the instantaneous changes which occur as the welder encounters unevenesses in the surface of the workpiece and/or ejection of the molten pool of metal which tend to increase the arc voltage and cause more ejection.

The output from the amplifier A4-1 is the error signal which is applied to control circuit A3 via isolation diode D5. The purpose of this diode is to prevent the different inputs to the control circuit A3 from affecting one another. Capacitor C16 is connected across resistor R36 in order to reduce high frequency spikes and transients generated by the welding arc and by the 20 kHz switching frequency of the motor guide circuit. Capacitor C18, connected in parallel with resistor R39, is a bypass capacitor whose function is to boost the gain of amplifier A4-1 upon rapid changes of the arc voltage. The D.C. gain of amplifier A4-1 is extremely high (e.g. 2000) so that the slightest change in either arc voltage and/or motor speed is detected so that the pulse-width modulator reacts instantly.

The high gain of amplifier A4-1 results in its output—i.e. the error signal—being either high or low, and is not linearly dependent upon the difference between the input signals applied to amplifier A4-1. The reason for this type of feedback control circuit is that it is not desirable to maintain a linear error signal as compared to a switched on-off signal because of the effect of the inherent inertia in the motor and the gear train and their slowness to respond to rapid changes in arc voltage. With the on-off type of signal appearing at the output of amplifier A4-1, the motor is forced to accelerate instantly and to turn off instantly, thereby compensating perfectly for any changes in the desired arc voltage.

MOTOR CURRENT AMPLIFIER CIRCUIT 15

This circuit is primarily intended to amplify the motor current signal which is generated by the resistor R46 and filtered by the resistor R47 and capacitor C22, as described above. The signal so generated is applied to the non-inverting input of an amplifier A4-4 whose gain is determined by the relative values of resistors R49 and R50. Capacitor C21 limits the high-frequency gain of the amplifier; back-to-back diodes D13 and D14 protect the input of the amplifier by preventing the difference of voltage between the two inputs from exceeding 0.6 volts.

The amplified output signal of amplifier A4-4 is applied to the non-inverting input of amplifier A4-2 through resistor R40 which is a current limiting resistor. An adjustable reference voltage is set by resistors R42, R43 and R44 of which resistor R43 is a trimmer resistor which is used to set the maximum allowable current of the motor. This reference voltage is applied to the inverting input of the amplifier A4-2 via a resistor R41. The resistor R41 acts in conjunction with the feedback resistor R37 to control the gain of amplifier A4-2. Capacitor C17 connected in parallel with resistor R37 is a highfrequency roll-off capacitor for the amplifier.

The reference voltage applied to amplifier A4-2 is set so that it is normally higher than the motor current signal coming from amplifier A4-4, this difference thus maintaining the output of amplifier A4-2 low. The circuit is set up so that, if the motor current exceeds a predetermined value, then the signal voltage exceeds the reference voltage and the amplifier instantly changes state. In these circumstances high voltage is applied from the output of amplifier A4-2 to the control input of the control circuit A3 and overrides the error signal coming from amplifier A4-1. This reduces the pulse-width applied to the motor and therefore limits the output torque of the motor.

An important advantage of the described apparatus is that maximum torque is always available irrespective of feed motor speed. For example, if wire feed is retarded e.g. by friction at the nozzle of the torch, decreased feed motor speed, and increased arc voltage would result which would cause increased heat generation, with perhaps distortion of the workpiece and loss of control. In known systems this effect could occur for a short period of time corresponding to a "dead zone" in the control system before remedial action to increase feed motor speed is effected. In the present invention, an increase in voltage would produce an increase in feed motor speed within a very short time, for example 50 $\mu$s to maintain a constant arc voltage.

Whilst finding wide application in industry it is hoped that the apparatus described above will be particularly effective in allowing successful welding in high ambient magnetic fields. Two known techniques which may augment the effectiveness of the apparatus when used in this application are, firstly, the addition of 2% oxygen to the inert shielding gas (argon) to enable deeper weld penetration below the surface of the workpiece and, secondly, the use of a tubular shield (not shown) of ferromagnetic material such as silicon steel attached to the tip of the welding torch nozzle to reduce the strength of the ambient magnetic field in the vicinity of the welding zone by about 100 gauss. In this case, the workpiece should be positioned about $\frac{1}{4}$-$\frac{3}{8}$ in. from the tip of the torch nozzle, the length: diameter ratio of the tube being 3 to 4:1.

We claim:

1. A welding wire feeder system for an electric arc welding apparatus, said system comprising means including a feed motor for feeding a welding wire electrode towards a workpiece, means for generating a feedback signal indicative of the speed of rotation of the feed motor, means for generating a control signal indicative of the instantaneous arc voltage at the tip of the welding wire, means for combining said control signal and said feedback signal to generate an error signal, a pulse width modulated power supply for supplying power from a power source to said feed motor, said power supply being operable to supply to the feed motor a pulse voltage whose mark/space ratio is controlled by said error signal, and means for controlling said power supply in response to said error signal in such a way that an increase in welding arc voltage causes a corresponding increase in the welding wire feed rate, and vice versa, said means for combining the control signal and the feedback signal being operable to compare a parameter of the two signals to generate an error signal having one of two distinct values representative, respectively, of the chosen parameter of the control signal being above or below the corresponding parameter of the feedback signal.

2. A welding wire feeder system as claimed in claim 1 wherein the power supply comprises a power transistor connected to control the supply of current from the source to the motor, and wherein said power supply controlling means comprises a pulse width modulator operable to generate a pulse signal whose mark/space ratio is controlled by said error signal, and means for applying said pulse signal to the control electrode of the power transistor to control the conduction of said transistor and hence the width of the pulses applied to the motor.

3. A welding wire feeder system as claimed in claim 1 wherein said combining means is a high gain amplifier having differential inputs respectively connected to receive said feedback signal and said control signal and such that its output error signal is either high or low dependent upon the relative amplitudes of the feedback and control signals.

4. A welding wire feeder system as claimed in either one of claims 1 or 3 wherein diode means are connected to said motor in such a way as to effectively short out the motor at times when driving current to the latter is reduced or switched off by the control action so that, at these times, the motor effectively becomes a generator and is rapidly dynamically braked by the resultant high current flow through the diode means.

5. A welding wire feeder system as claimed in claim 1 wherein said feedback signal generating means comprises first means for generating a signal whose frequency is dependent upon the motor speed and second means for integrating this latter signal to form a feedback signal whose amplitude is dependent upon motor speed.

6. A welding wire feeder system as claimed in claim 5 wherein said feedback signal generating means further comprises differentiating means for differentiating said latter signal prior to integration with a time constant which is less than the shortest ON time of the signal, and wherein the subsequent integration is carried out at a relatively slower speed still.

7. A welding wire feeder system as claimed in either one of claims 5 or 6 wherein said first means comprises a wheel operably connected for rotation with the motor, said wheel being arranged in such a way that, as it rotates, it interrupts a beam of light passing from a light source to a light receiver so as to provide, at the output of the light receiver, a chopped signal whose frequency is indicative of the speed of the wheel, and hence the motor.

8. A welding wire feeder system as claimed in claim 7 wherein the wheel takes the form of the motor ventilation fan.

9. A welding wire feeder system as claimed in claim 1 further comprising means for inhibiting operation of the power supply controlling means whenever the arc voltage exceeds a predetermined limit.

10. A welding wire feeder system as claimed in claim 9 further comprising means for overriding said inhibiting means to allow manual operation of the feed motor even where the arc voltage is above said predetermined limit.

* * * * *